United States Patent Office 2,735,848
Patented Feb. 21, 1956

2,735,848

AMINE SALTS OF PENICILLIN G

William H. Edgerton, Huntington Woods, and Robert L. Hull, Detroit, Mich., assignors to Parke, Davis & Company, Detroit, Mich., a corporation of Michigan No Drawing. Application August 11, 1953,
Serial No. 373,655

8 Claims. (Cl. 260—239.1)

This invention relates to salts of penicillin G and to methods for producing the same. More particularly, the invention relates to N-phenalkyl-α-benzylphenethylamine salts of penicillin G which have the formula

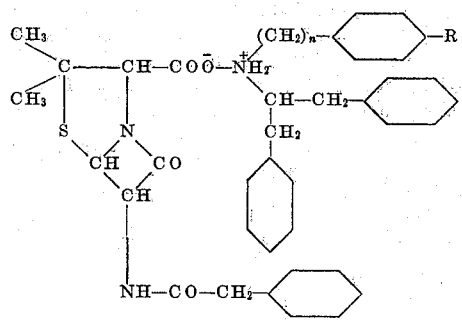

where $n$ is 1 to 3 and R is a hydrogen atom, a halogen atom, an alkoxy group, an alkyl group, a halogenated alkoxy group or a benzyloxy group.

In accordance with the invention the preferred method for producing N-phenalkyl-α-benzylphenethylamine salts of penicillin G having the above formula comprises reacting a water soluble salt of penicillin G with a mineral acid salt of a N-phenalkyl-α-benzylphenethylamine of formula

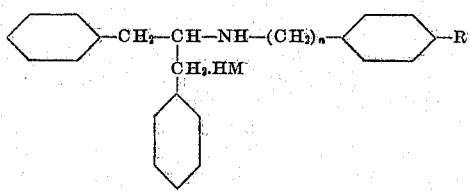

where $n$ and R have the same significance as given above and HM is one equivalent of a mineral acid; in an aqueous reaction medium. Some of the water soluble salts of penicillin G which can be used are sodium penicillin G, potassium penicillin G, calcium penicillin G and ammonium penicillin G while suitable mineral acid salts of the N-phenalkyl-α-benzylphenethylamine compound are the hydrochloride, hydrobromide, sulfate, hydro-iodide, phosphate, sulfamate and the like. As a reaction medium water or an aqueous solution containing a water-miscible organic solvent can be used. Some of the water miscible organic solvents which can be employed for this purpose are methanol, ethanol, isopropanol, acetone, N,N-dimethylacetamide, N,N-dimethylformamide, dioxane and the monomethyl ether of ethylene glycol. In carrying out the process the temperature of the reaction mixture is kept below 40° C. to minimize the decomposition of the penicillin G reactant and the final product. The preferred reaction temperature is in the neighborhood of 15 to 30° C. Approximately equivalent quantities of the two reactants are preferably employed in carrying the process although, if desired, a small excess of either of the reactants can be used.

The N-phenalkyl-α-benzylphenethylamine salts of penicillin G of the invention can also be produced by reacting benzylpenicillinic acid (the free acid of penicillin G) with the free base of an N-phenalkyl-α-benzylphenethylamine of formula

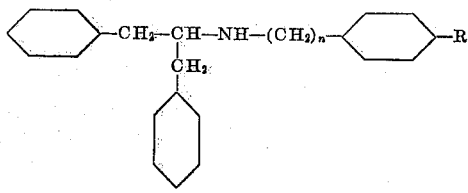

where $n$ and R have the same significance as given above; in substantially anhydrous organic solvent such as ether, benzene, chloroform, xylene, ethylene dichloride and the like. The temperature during the reaction is kept below 40° C. and preferably between about 0 and 20° C. Approximately equivalent quantities of the two reactants are preferably employed but, if desired, a slight excess of either reactant can be used.

The products of the invention are only very slightly soluble in water and are of particular value in the instances where it is desirable to administer penicillin by the oral route. These products upon oral administration produce extremely high blood levels of penicillin G which persist for long periods of time. The products can be admixed with inert diluents and pressed into tablets or filled into capsules for convenient administration. They may also be incorporated into emulsions or suspensions for administration by either the oral or parenteral routes. The usual oral dosage for humans of the penicillin salts of the invention in the treatment of most conditions is in the neighborhood of 250 to 400 mg. two to four times per day.

The invention is illustrated by the following examples.

Example 1

A solution containing 1 g. of potassium penicillin G assaying 1578 Oxford units per mg. in 20 to 40 ml. of water is added to a solution containing 0.91 g. of N-benzyl-α-benzylphenethylamine hydrochloride in 20 ml. of N,N-dimethylacetamide at room temperature. The reaction mixture is cooled and the desired N-benzyl-α-benzylphenethylamine salt of penicillin G collected and washed with water; M. P. 119–21° C. This salt which is soluble in water to the extent of 0.076% at 25° C. contains by assay about 930 Oxford units of penicillin per mg. The formula of this compound is

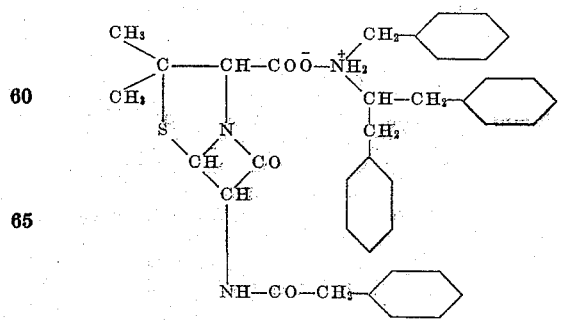

If desired, an equivalent amount of either sodium penicillin G or calcium penicillin G can be substituted for the potassium penicillin G used in the above procedure. Also, if desired, an equivalent amount of either N-benzyl-α-benzylphenethylamine hydrobromide or N-benzyl-α-benzylphenethylamine sulfate can be substituted for the N-benzyl-α-benzylphenethylamine hydrochloride used in the above procedure.

*Example 2*

A solution containing 1 g. of potassium penicillin G assaying 1578 Oxford units per mg. in 20 ml. of water is added to a solution containing 0.98 g. of N-p-methoxybenzyl-α-benzylphenethylamine hydrochloride in 20 ml. of N,N-dimethylacetamide at room temperature. The reaction mixture is cooled and the desired N-p-methoxybenzyl-α-benzylphenethylamine salt of penicillin G collected and washed with water; M. P. 114–16° C. This salt which is soluble in water to the extent of 0.056% at 25° C. contains by assay about 885 Oxford units of penicillin per mg. The formula of this compound is

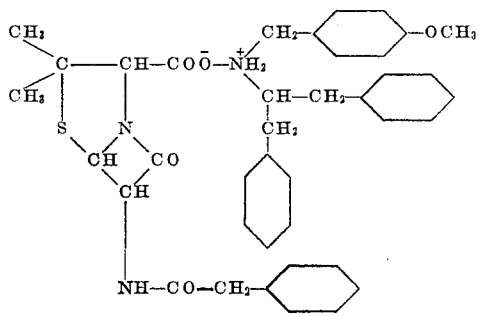

*Example 3*

A solution containing 1 g. of potassium penicillin G assaying 1578 Oxford units per mg. in 25 ml. of water is added to a solution containing 1 g. of N-p-ethoxybenzyl-α-benzylphenethylamine hydrochloride in 20 ml. of N,N-dimethylacetamide at room temperature. The reaction mixture is cooled and the desired N-p-ethoxybenzyl-α-benzylphenethylamine salt of penicillin G collected and washed with water; M. P. 129–30° C. This salt which is soluble in water to the extent of 0.047% at 25° C. contains by assay about 865 Oxford units of penicillin per mg. The formula of this compound is

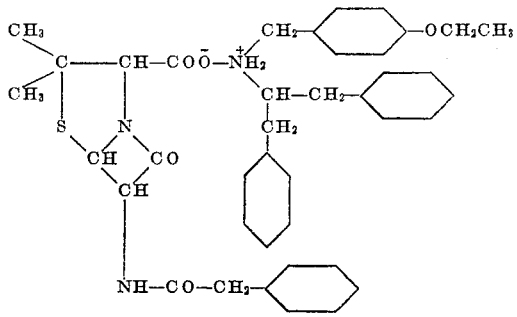

*Example 4*

A solution containing 1 g. of potassium penicillin G assaying 1578 Oxford units per mg. in 25 ml. of water is added slowly with stirring to a solution containing 1.1 g. of N-p-isopropoxybenzyl-α-benzylphenethylamine hydrochloride in 20 ml. of N,N-dimethylacetamide at room temperature. The reaction mixture is cooled and the desired N-p-isopropoxybenzyl-α-benzylphenethylamine salt of penicillin G collected and washed with water; M. P. 142–43° C. This salt which is soluble in water to an extent of 0.033% at 25° C. contains by assay about 845 Oxford units of penicillin per mg. The formula of this compound is

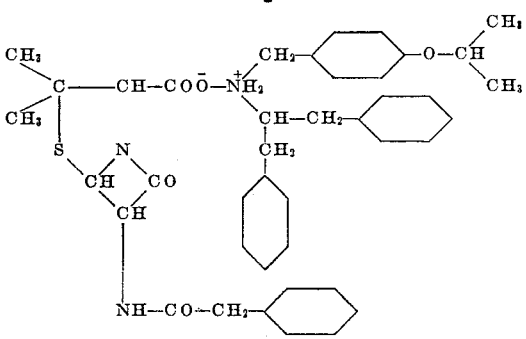

*Example 5*

A solution containing 1 g. of potassium penicillin G assaying 1578 Oxford units per mg. in 20 ml. of water is added slowly with stirring to a solution containing 1.2 g. of N-p-γ-chloropropoxybenzyl-α-benzylphenethylamine hydrochloride in 20 ml. of N,N-dimethylacetamide at room temperature. The reaction mixture is cooled and the desired N-p-γ-chloropropoxybenzyl-α-benzylphenethylamine salt of penicillin G collected and washed with water; M. P. 128–30° C. This salt which is soluble in water to the extent of 0.021% at 25° C. contains by assay about 870 Oxford units of penicillin per mg. The formula of this compound is

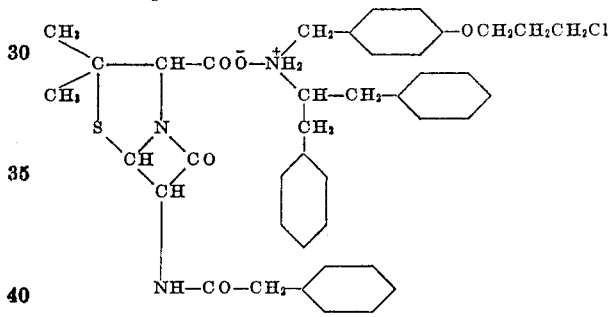

*Example 6*

A solution containing 50 g. of potassium penicillin G assaying 1578 Oxford units per mg. in 1000 ml. of water is added slowly with stirring to a solution containing 51.5 g. of N-p-n-butoxybenzyl-α-benzylphenethylamine hydrochloride in 1000 ml. of N,N-dimethylacetamide at room temperature. The reaction mixture is cooled and the desired N-p-n-butoxybenzyl-α-benzylphenethylamine salt of penicillin G collected and washed with water; M. P. 132–34° C. This salt which is soluble in water to the extent of 0.017% at 25° C. contains by assay about 830 Oxford units of penicillin per mg. The formula of this compound is

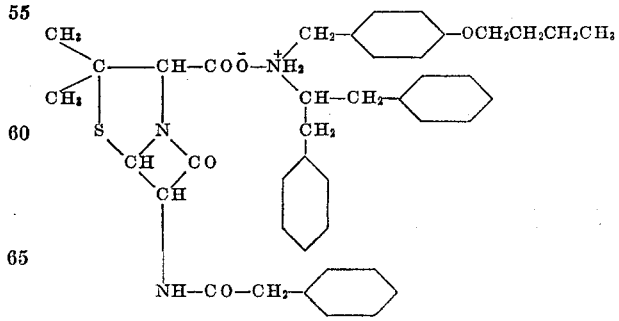

*Example 7*

A solution containing 1 g. of potassium penicillin G assaying 1578 Oxford units per mg. in 25 ml. of water is added slowly with stirring to a solution containing 1.1 g. of N-p-n-amyloxybenzyl-α-benzylphenethylamine hydrochloride in 20 ml. of N,N-dimethylacetamide at room temperature. The reaction mixture is cooled and the desired N-p-n-amyloxybenzyl-α-benzylphenethylamine salt of penicillin G collected and washed with water; M. P. 134–35° C. This salt which is soluble in water to the extent of 0.012% at 25° C. contains by assay about 815 Oxford units of penicillin per mg. The formula of this compound is

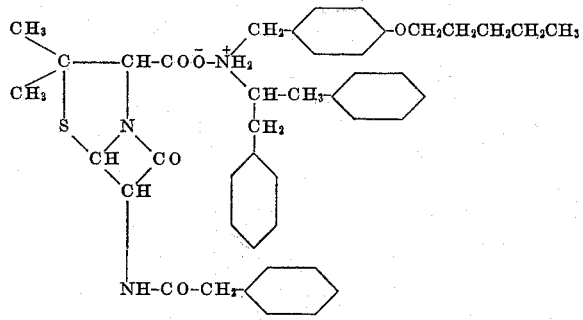

*Example 8*

A solution containing 1 g. of potassium penicillin G assaying 1578 Oxford units per mg. in 25 ml. of water is added slowly with stirring to a solution containing 1 g. of N-p-isopropylbenzyl-α-benzylphenethylamine hydrochloride in 20 ml. of N,N-dimethylacetamide at room temperature. The reaction mixture is cooled and the desired N-p-isopropylbenzyl-α-benzylphenethylamine salt of penicillin G collected and washed with water; M. P. 137–38° C. This salt which is soluble in water to the extent of 0.022% at 25° C. contains by assay about 885 Oxford units of penicillin per mg. The formula of this compound is

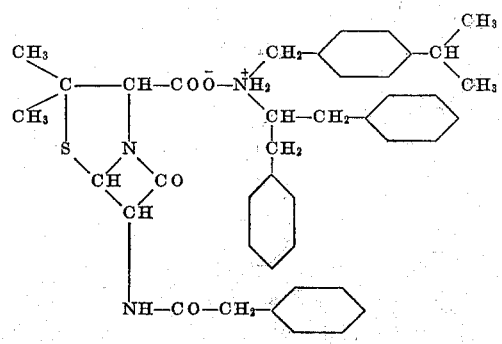

*Example 9*

A solution containing 2 g. of potassium penicillin G assaying 1578 Oxford units per mg. in 150 ml. of water is added slowly with stirring to a solution containing 2 g. of N-γ-phenylpropyl-α-benzylphenethylamine hydrochloride and 25 ml. of N,N-dimethylacetamide at room temperature. The reaction mixture is cooled and the desired N-γ-phenylpropyl-α-benzylphenethylamine salt of penicillin G collected and washed with water; M. P. 117–19° C. This salt which is soluble in water to the extent of 0.02% at 25° C. contains by assay about 875 Oxford units of penicillin per mg. The formula of this compound is

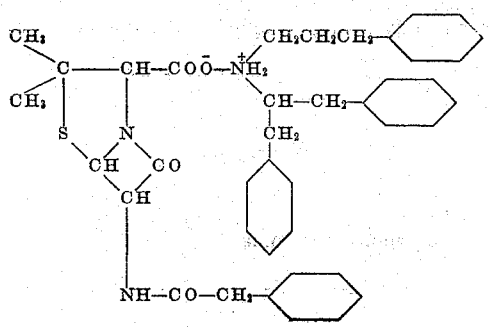

*Example 10*

A solution containing 1 g. of potassium penicillin G assaying 1578 Oxford units per mg. in 25 ml. of water is added slowly with stirring to a solution containing 1.1 g. of N-p-n-propoxybenzyl-α-benzylphenethylamine hydrochloride in 20 ml. of N,N-dimethylacetamide at room temperature. The reaction mixture is cooled and the desired N-p-n-propoxybenzyl-α-benzylphenethylamine salt of penicillin G collected and washed with water; M. P. 133–35° C. This salt which is soluble in water to the extent of 0.038% at 25° C. contains by assay about 845 Oxford units of penicillin per mg. The formula of this compound is

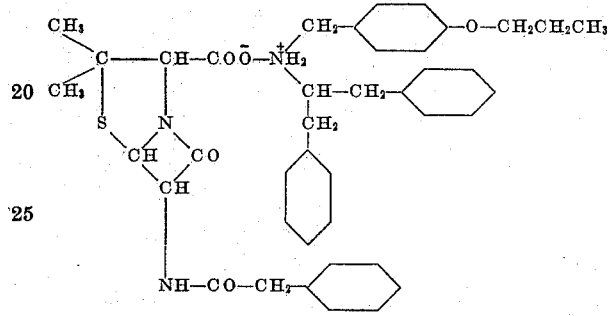

*Example 11*

A solution containing 1 g. of potassium penicillin G assaying 1578 Oxford units per mg. in 25 ml. of water is added slowly with stirring to a solution containing 1.3 g. of N-p-n-decyloxybenzyl-α-benzylphenethylamine hydrochloride in 20 ml. of N,N-dimethylacetamide at room temperature. The reaction mixture is cooled and the desired N-p-n-decyloxybenzyl-α-benzylphenethylamine salt of penicillin G collected and washed with water; M. P. 142–44° C. This salt which is soluble in water to the extent of 0.012% at 25° C. contains by assay about 740 Oxford units of penicillin per mg. The formula of this compound is

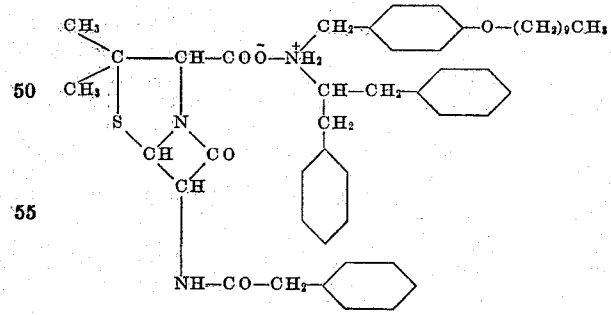

*Example 12*

A solution containing 1 g. of potassium penicillin G assaying 1578 Oxford units per mg. in 20 ml. of water is added slowly with stirring to a solution containing 1 g. of N-p-chlorobenzyl-α-benzylphenethylamine hydrochloride in 20 ml. of N,N-dimethylacetamide at room temperature. The reaction mixture is cooled and the desired N-p-chlorobenzyl-α-benzylphenethylamine salt of penicillin G collected and washed with water; M. P. 126–28° C. This salt which is soluble in water to the extent of 0.065% at 25° C. contains by assay about 880 Oxford units of penicillin per mg. The formula of this compound is

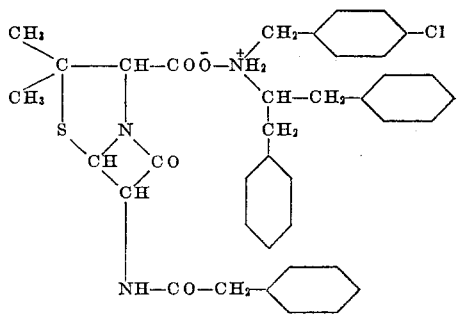

*Example 13*

A solution containing 1 g. potassium penicillin G assaying 1578 Oxford units per mg. in 20 ml. of water is added slowly with stirring to a solution containing 1 g. of N-p-methylbenzyl-α-benzylphenethylamine hydrochloride in 20 ml. of N,N-dimethylacetamide at room temperature. The reaction mixture is cooled and the desired N-p-methylbenzyl-α-benzylphenethylamine salt of penicillin G collected and washed with water; M. P. 118–20° C. This salt which is soluble in water to the extent of 0.060% at 25° C. contains by assay about 890 Oxford units of penicillin per mg. The formula of this compound is

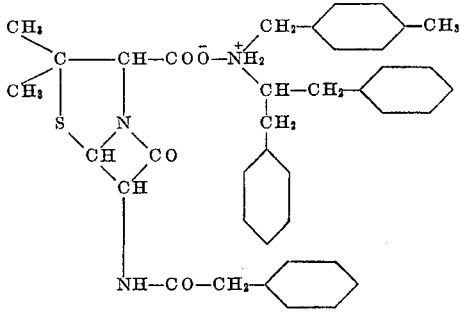

*Example 14*

A solution containing 1 g. of potassium penicillin G assaying 1578 Oxford units per mg. in 20 ml. of water is added to a solution containing 1.1 g. of N-sec.-butoxybenzyl-α-benzylphenethylamine hydrochloride in 20 ml. of N,N-dimethylacetamide at room temperature. The reaction mixture is cooled and the desired N-sec.-butoxybenzyl-α-benzylphenethylamine salt of penicillin G is collected and washed with water; M. P. 142–43° C. This salt which is soluble in water to the extent of 0.026% at 25° C. contains by assay about 820 Oxford units of penicillin per mg. The formula of this compound is

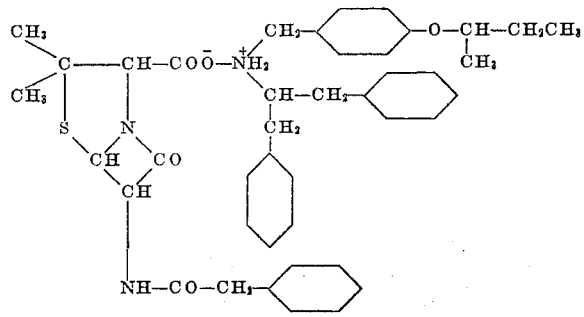

*Example 15*

A solution containing 2 g. of potassium penicillin G assaying 1578 Oxford units per mg. in 40 ml. of water is added to a solution containing 2.4 g. of N-p-benzyloxybenzyl-α-benzylphenethylamine hydrochloride in 40 ml. of N,N-dimethylacetamide at room temperature. The reaction mixture is cooled and the desired N-p-benzyloxybenzyl-α-benzylphenethylamine salt of penicillin G is collected and washed with water; M. P. 139–41° C. This salt which is soluble in water to the extent of 0.009% at 25° C. contains by assay about 790 Oxford units of penicillin per mg. The formula of this compound is

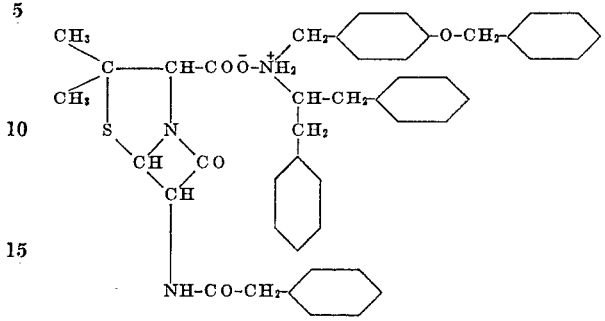

*Example 16*

A solution containing 1 g. of potassium penicillin G assaying 1578 Oxford units per mg. in 25 ml. of water is added slowly with stirring to a solution containing 1.1 g. of N-p-isoamyloxybenzyl-α-benzylphenethylamine hydrochloride in 20 ml. of N,N-dimethylacetamide at room temperature. The reaction mixture is cooled and the desired N-p-isoamyloxybenzyl-α-benzylphenethylamine salt of penicillin G collected and washed with water; M. P. 134–35° C. This salt which is soluble in water to the extent of 0.019% at 25° C. contains by assay about 800 Oxford units of penicillin per mg. The formula of this compound is

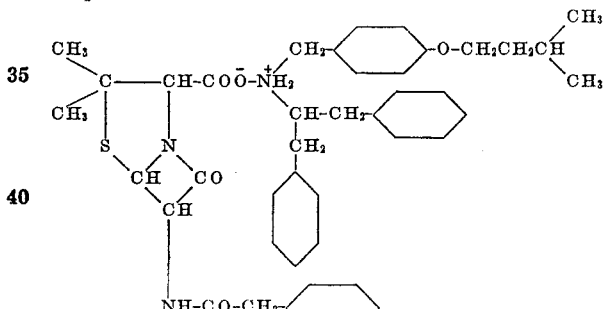

*Example 17*

A solution containing 0.95 g. of sodium penicillin G assaying 1650 Oxford units per mg. in 20 ml. of water is added slowly with stirring to a solution containing 1.1 g. of N-p-n-butoxybenzyl-α-benzylphenethylamine hydrochloride in 20 ml. of N,N-dimethylacetamide at room temperature. The reaction mixture is cooled and the desired N-p-n-butoxybenzyl-α-benzylphenethylamine salt of penicillin G collected and washed with water; M. P. 132–34° C. This product is identical in all respects to the product produced by the procedure described in Example 6.

The N-phenalkyl-α-benzylphenethylamines and their mineral acid salts used as starting materials in the practice of the invention can be prepared by the methods described and claimed in our copending application Serial No. 373,654, filed under even date herewith. One of these methods involves reacting a compound of formula

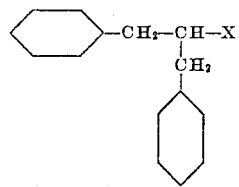

with a compounds of formula

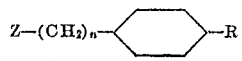

where n and R have the same significance as given above and X is halogen atom or a primary amino group and Z is a primary amino group when X is a halogen atom and Z is a halogen atom when X is a primary amino group. The reaction is preferably carried out at a temperature between 80 and 110° C. using approximately equivalent amounts of the two reactants in a solvent such as a lower aliphatic acohol, benzene, toluene, xylene or the like. In this instance the product is the hydrohalide salt of the desired amine while if two equivalents of the amine starting material are used the product is the free base of the desired N-phenalkyl-α-benzylphenethylamine.

Another method for producing the N-phenalkyl-α-benzylphenethylamines comprises reacting α-benzylphenethylamine with an aldehyde of formula

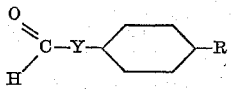

and subjecting the Schiff base compound so produced to catalytic hydrogenation; where R has the same significance as given above and Y represents a direct bond from the carbonyl group of the phenyl ring, an alkylene group containing 1 or 2 carbon atoms or a vinylene radical. The first step of the process is preferably carried out in a substantially anhydrous organic solvent such as a lower aliphatic alcohol, benzene, toluene, xylene and the like at a temperature between 60 and 100° C. The catalytic hydrogenation is preferably carried out in the same solvent as used in the first step and in the presence of a noble metal catalyst. The preferred hydrogen pressure for the reduction is between two to four atmospheres while the preferred temperature is between 25 and 60° C.

What we claim is:

1. A N-phenalkyl-α-benzylphenethylamine salt of penicillin G of formula

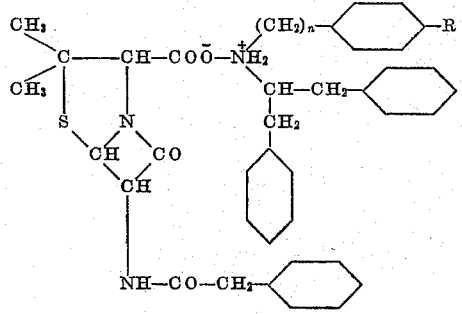

where n is 1 to 3 and R is a member of the class consisting of hydrogen atom, a halogen atom, an alkoxy group, an a lower alkyl group, a monohalo lower alkoxy group and a benzyloxy group.

2. A N-phenalkyl-α-benzylphenethylamine salt of penicillin G of formula

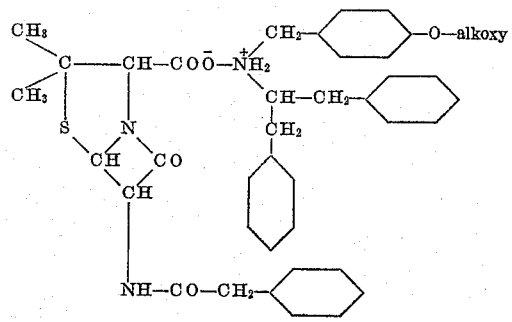

3. The N-p-n-butoxybenzyl-α-benzylphenethylamine salt penicillin G.
4. The N-p-n-amyloxybenzyl-α-benzylphenethylamine salt of penicillin G.
5. The N-p-n-decyloxybenzyl-α-benzylphenethylamine salt of penicillin G.
6. The N-p-benzyloxybenzyl-α-benzylphenethylamine salt of penicillin G.
7. A N-phenalkyl-α-benzylphenethylamine salt of penicillin G of formula

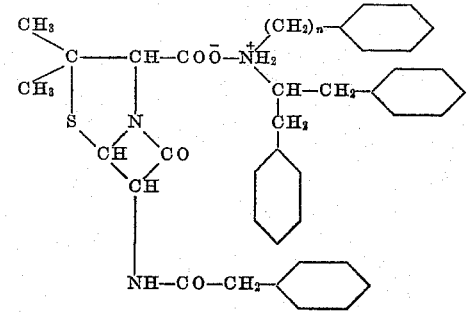

where n is 1 to 3.

8. The N-γ-phenylpropyl-α-benzylphenethylamine salt of penicillin G.

References Cited in the file of this patent
UNITED STATES PATENTS

| 2,585,432 | Buckwalter | Feb. 12, 1952 |
| 2,585,436 | Cheney | Feb .12, 1952 |